(12) United States Patent
Fruehling et al.

(10) Patent No.: US 12,140,751 B2
(45) Date of Patent: Nov. 12, 2024

(54) FRINGING-FIELD, PARALLEL PLATE ACTUATOR

(71) Applicant: TEXAS INSTRUMENTS INCORPORATED, Dallas, TX (US)

(72) Inventors: Adam Joseph Fruehling, Garland, TX (US); James Norman Hall, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 350 days.

(21) Appl. No.: 17/114,369

(22) Filed: Dec. 7, 2020

(65) Prior Publication Data

US 2021/0215928 A1    Jul. 15, 2021

Related U.S. Application Data

(60) Provisional application No. 62/958,835, filed on Jan. 9, 2020.

(51) Int. Cl.
*G02B 26/08* (2006.01)
*G02B 26/06* (2006.01)
*H02N 1/00* (2006.01)

(52) U.S. Cl.
CPC ......... *G02B 26/0841* (2013.01); *G02B 26/06* (2013.01); *H02N 1/006* (2013.01)

(58) Field of Classification Search
CPC ........ G02B 26/00; G02B 26/08; G02B 26/06; G02B 26/0841; G02B 26/0833; G02B 27/425; G02B 7/1821; G02B 6/357; H02N 1/00; H02N 1/006; H02N 1/008; B81B 3/00; B81B 3/0043; B81B 2201/04; B81B 3301/042

USPC .......... 359/290, 291, 295, 298, 221.2, 211.5, 359/212.1, 223.1, 224.1, 225.1, 318, 872, 359/873, 874, 876
See application file for complete search history.

(56) References Cited

U.S. PATENT DOCUMENTS

| | | | | |
|---|---|---|---|---|
| 5,096,279 | A | * | 3/1992 | Hornbeck .......... G02B 6/12004 348/E5.142 |
| 7,123,400 | B2 | * | 10/2006 | Murakami .......... G02B 26/105 359/290 |
| 9,348,136 | B2 | | 5/2016 | McDonald et al. |
| 10,371,939 | B2 | | 8/2019 | McDonald et al. |
| 10,831,018 | B2 | | 11/2020 | Fruehling et al. |

(Continued)

FOREIGN PATENT DOCUMENTS

FR    2865201 A1 *  7/2005  ............. H02N 1/008

OTHER PUBLICATIONS

English translation of FR 2865201. (Year: 2005).*

*Primary Examiner* — Jie Lei
(74) *Attorney, Agent, or Firm* — Michelle F. Murray; Frank D. Cimino (57) ABSTRACT

A phase light modulator includes a base plate, a mirror, a perforated hinge plate, and first second support posts. The perforated hinge plate supports the mirror. The perforated hinge plate has first and second flexural arms. The perforated hinge plate is configured to move toward or away from the base plate based on application of a potential difference between the base plate and the perforated hinge plate. The first flexural arm is connected to the first support posts, and the second flexural arm is connected to the second support post.

17 Claims, 7 Drawing Sheets

(56) References Cited

U.S. PATENT DOCUMENTS

2004/0145854 A1\* 7/2004 Tamura ............... G02B 7/1821
  361/233
2008/0007376 A1\* 1/2008 Jeong .................. G02B 26/085
  324/661
2019/0179135 A1 6/2019 McDonald et al.
2020/0209614 A1 7/2020 McDonald et al.

\* cited by examiner

FRINGING-FIELD, PARALLEL PLATE ACTUATOR

CROSS-REFERENCE TO RELATED APPLICATION

This application claim priority to U.S. Provisional Application No. 62/958,835, filed Jan. 9, 2020, titled "Fringing-Field Piston-Mode Parallel Plate Actuator," which is hereby incorporated herein by reference in its entirety.

BACKGROUND

Actuators (e.g., electrostatic and non-electrostatic) are used in various technologies. For example, actuators may be used in phase light modulators (PLMs) to modulate the phase of light. Phase light modulators can be implemented as microelectromechanical systems (MEMS) that include an array of mirrors. Incident light beams reflect off the mirrors. The MEMS mirrors can be independently, vertically moved to vary the phase of the incident light beam. Each mirror may represent a pixel. Each pixel in such microelectromechanical actuator systems includes a base electrode as well as a spring electrode coupled to the mirror. When a voltage differential is created between the base electrode and the spring electrode, the spring electrode moves towards the base electrode, thereby moving the mirror to a different position. Such microelectromechanical system phase light modulators are used in a variety of applications such as high dynamic range cinema, light detection and ranging systems, high volume optical switching (e.g., used in telecom or server farms), microscopy/spectroscopy/adaptive optics (e.g., used in astronomy, ophthalmology, machine vision, etc.), and holographic displays.

SUMMARY

In at least one example, a phase light modulator includes a base plate, a mirror, a perforated hinge plate, and first second support posts. The perforated hinge plate supports the mirror. The perforated hinge plate has first and second flexural arms. The perforated hinge plate is configured to move toward or away from the base plate based on application of a potential difference between the base plate and the perforated hinge plate. The first flexural arm is connected to the first support posts, and the second flexural arm is connected to the second support post.

DETAILED DESCRIPTION

As described above, to modulate a beam of light, a phase light modulator (PLM) includes mirrors that can be adjusted (e.g., moved or displaced) in order to change the properties (e.g., phase) of a reflected beam of light. In some examples, spatial light modulators use actuators to move the mirrors responsive to applied voltages. In some examples, PLMs use microelectromechanical systems (MEMS)-based actuators to move the mirrors based on a combination of an electrostatic force and a spring force.

A parallel-plate, electrostatic actuator (e.g., used in a MEMS) is a device that uses electrostatic force to move an object (e.g., a mirror of a phase light modulator pixel). For example, the actuator includes a first electrode that supports a mirror. The first electrode is also anchored to an attachment at a distance d from a second (fixed) electrode. The first electrode includes one or more flexural arms attached to support posts. The flexural arms function as a spring (having a spring constant, k) and contribute to a spring constant, k (stiffness). The first and second electrodes are parallel to each other, and a potential difference is applied between the electrodes to force them closer together or farther apart, hence the name "parallel-plate actuator."

Responsive to an applied potential difference (which creates an electrostatic force) between the first and second electrodes relative to the spring implemented by the first electrode and its flexural arms, the first electrode moves towards (or away from) the second electrode. In one implementation, the first electrode is grounded and the second electrode is coupled to a voltage regulator. The voltage regulator applies a bias voltage to the second electrode. When the bias voltage applied to the second electrode increases, the voltage differential between the first electrode and the second electrode generates an electrostatic force that drives the first electrode toward the second electrode, thereby moving the mirror toward the second electrode. Alternatively, the second electrode may be implemented as a digital electrode such that the amount of area of the second electrode subject to an applied voltage can be varied. As the amount of area of the second electrode receiving the applied voltage increases, the electrostatic force also increases, resulting in the first electrode being pulled closer to the second electrode. As the voltage decreases (and/or the amount of area applying the voltage on the second electrode decreases), the electrostatic force decreases, resulting in the first electrode moving away from the second electrode (e.g., due to the mechanical force of the flexural arms). In this manner, a controller can control the voltage and/or amount of area receiving a voltage on the second electrode to control the position of the first electrode, thereby controlling the position of the mirror. The amount of travel of a mirror corresponds to an achievable phase modulation of the PLM.

Electrostatic actuators include a "pull-in" point, also referred to herein as a collapsing point or an instability point, corresponding to a maximum distance that the first electrode can travel before a collapse occurs. A collapse refers to the first electrode accelerating into contact with the second electrode, thereby destroying the functionality of the pixel. The pull-in point is an equilibrium point, beyond which the system is unstable.

The value "g" refers to the distance between the first and second electrodes in the absence of any electrostatic force (i.e., with no applied potential difference). For parallel plate actuators, the first electrode cannot travel a distance more than ⅓×g before the electrodes uncontrollably collapse together. For example, if g is 900 micrometers ("microns"), the first electrode may only travel 300 microns towards the base electrode before pull-in occurs. The amount of phase modulation is a function of the relative travel distance between the electrodes and the pixel pitch. The ⅓×g travel limitation undesirably limits the optical bandwidth of the PLM. Larger differentiation from large pitch PLMs (i.e., PLMs in which the g spacing between the electrodes is large) can be implemented to attempt to provide for greater inter-electrode travel distances. For example, a PLM with a g of 1500 microns permits an inter-electrode travel distance of 500 microns, which is larger than the 300-micron travel distance for a PLM with a g of 900 microns. The pull-in voltage (Vpi) refers to the maximum voltage that can be applied across the electrodes before pull-in occurs. For a parallel-plate actuator, Vp_i is:

$$V_{pi} = \sqrt{\frac{8}{27} \frac{k*g^3}{\epsilon A}} \quad (1)$$

where k is the spring constant of the first electrode, e is the permittivity of the dielectric between the two electrodes, and A is the area of second (fixed) electrode. From Eq. (1), the pull-in voltage becomes larger as g increases. The voltage magnitude requirement for Vpi will become impractical of values of g over a certain value. The pull-in voltage can be reduced with a smaller value of k (the spring constant of the flexural arms). However, making the value of k small enough to avoid an excessively large PLM may also be impractical. A design tension thus exists between (for a given pixel pitch and material thickness of the hinge), on one hand, wanting g to be larger to facilitate a higher optical bandwidth PLM and, on the other hand, requiring either an impractically large bias voltage or a spring with an impractically small spring constant.

Figure 1A:
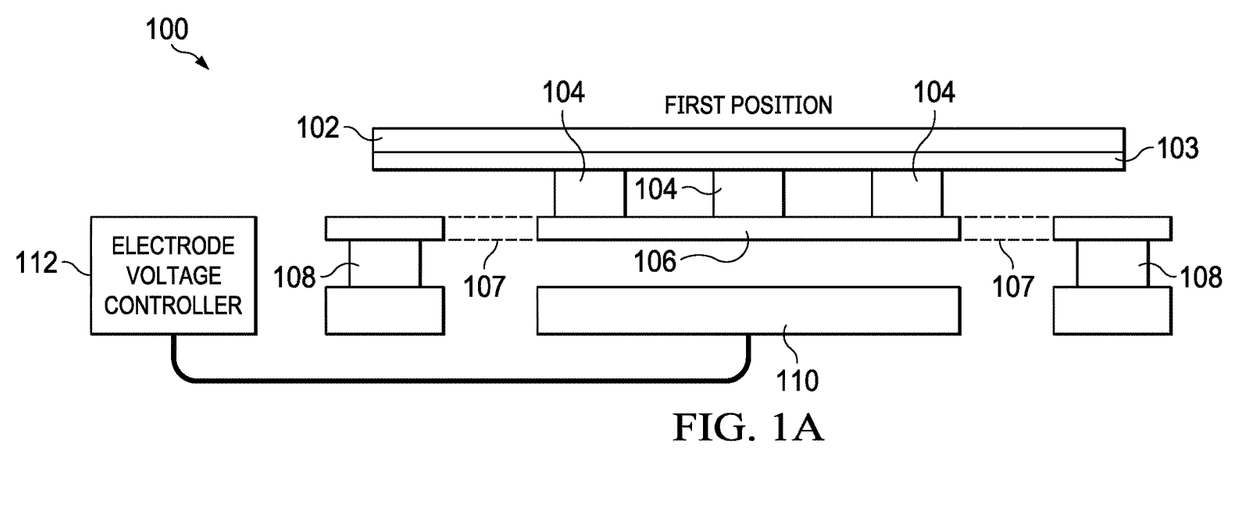
FIGS. 1A and 1B illustrate two different vertical positions of a mirror within a phase light modulator.
Figure 1B:
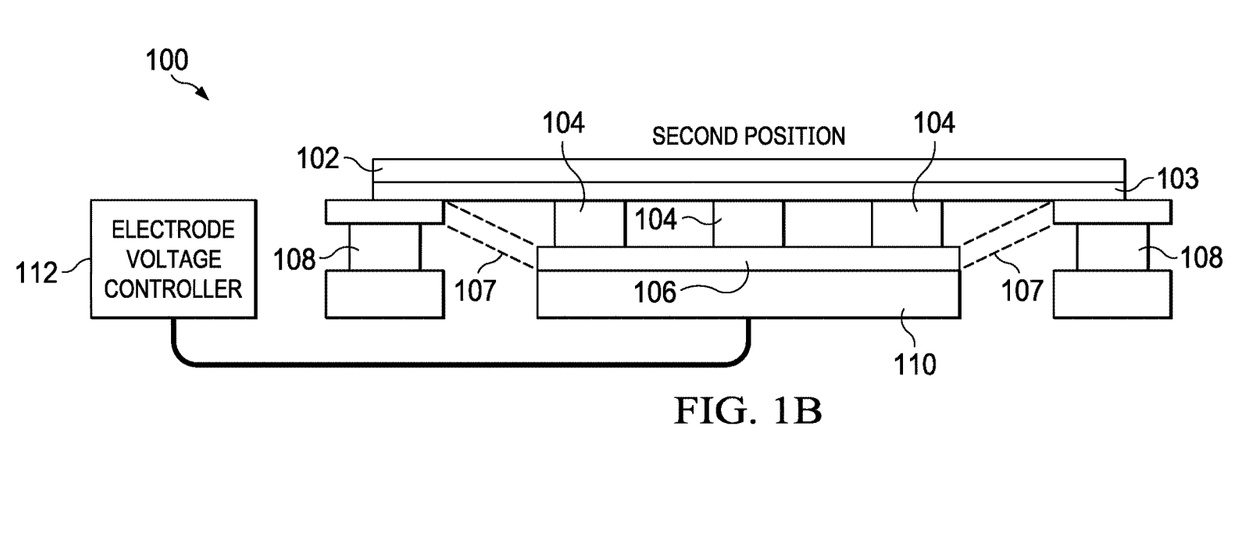

FIGS. 1A-1B illustrate an example parallel-plate, electrostatic actuator 100 (e.g., to implement a MEMS-based PLM) at two different positions. The example actuator 100 of FIGS. 1A-1B includes a mirror 102, a support plate 103, mirror attachments 104 (e.g., mirror vias), a hinge plate 106 (also called a "spring electrode"), flexural arms 107, support posts 108, a base plate 110 (also called a "base electrode"), and an electrode voltage controller 112.

The mirror 102 of FIGS. 1A-1B reflects a beam of light in two or more directions depending on the position of the mirror 102. For example, and as shown in FIG. 1A, the mirror 102 is extended to a first position (e.g., a neutral position when no voltage is applied to the example base plate 110) to reflect light in a first direction. The mirror 102 is retracted to a second position in FIG. 1B to reflect light in a second direction. The mirror 102 is supported by the support plate 103. The support plate 103 is coupled to the hinge plate 106 by way of the mirror attachments 104. In some examples, the support plate 103 may be absent and the mirror 102 may be coupled directly to the mirror attachments 104. In some examples, a different object may be included in place of the mirror 102. In the example of FIGS. 1A and 1B, the mirror 102 and/or support plate 103 are fabricated to be larger than the hinge plate 106, such that the mirror 102 and/or support plate 103 overhang the support posts 108. In this particular configuration, the support posts 108 act as a mechanical stop to the support plate 103 so that the surface of the hinge plate 106 facing the base plate 110 can just contact the base plate 110. Although the example structure 100 of FIGS. 1A-1B includes three mirror attachments 104, the structure 100 may include any number of mirror attachment(s).

The example hinge plate 106 of FIGS. 1A-1B is an electrode including the flexural arms 107. The flexural arms 107 of the hinge plate 106 are characterized by a mechanical spring constant. When stretched, the flexural arms 107 apply a mechanical force in the opposite direction of the stretching. The flexural arms 107 are attached to the support posts 108. The support posts 108 are grounded in this example. The support posts 108, flexural arms 107, and hinge plate 106 are all formed of an electrically conductive material (e.g., a metal) and coupled together (or formed as a unitary set of components), and thus hinge plate 106 is at the ground potential as a result of the support posts 108 being grounded. In this manner, when an electrostatic force is applied to the hinge plate 106, the flexural arms 107 extend toward the base plate 110 causing the hinge plate 106 to move towards the base plate 110, thereby causing the mirror 102 to move from the first position of FIG. 1A towards the second position of FIG. 1B (i.e., closer to the base plate 110). The mirror attachments 104 may provide rigidity to the hinge plate 106 to ensure that the hinge 106 does not flex as the electrostatic force increases. Although FIGS. 1A and 1B illustrate two positions for the hinge plate 106 relative to the base plate 110, the potential difference applied between the hinge plate 106 and the base plate 110 can be varied to cause the hinge plate 106 to be at any of multiple (two, three, four, or more) different positions relative to the base plate 110. For example, the separation distance between the hinge plate 106 and base plate 110 can be continuously varied through analog voltage control or a continuously varied output.

Figure 2:
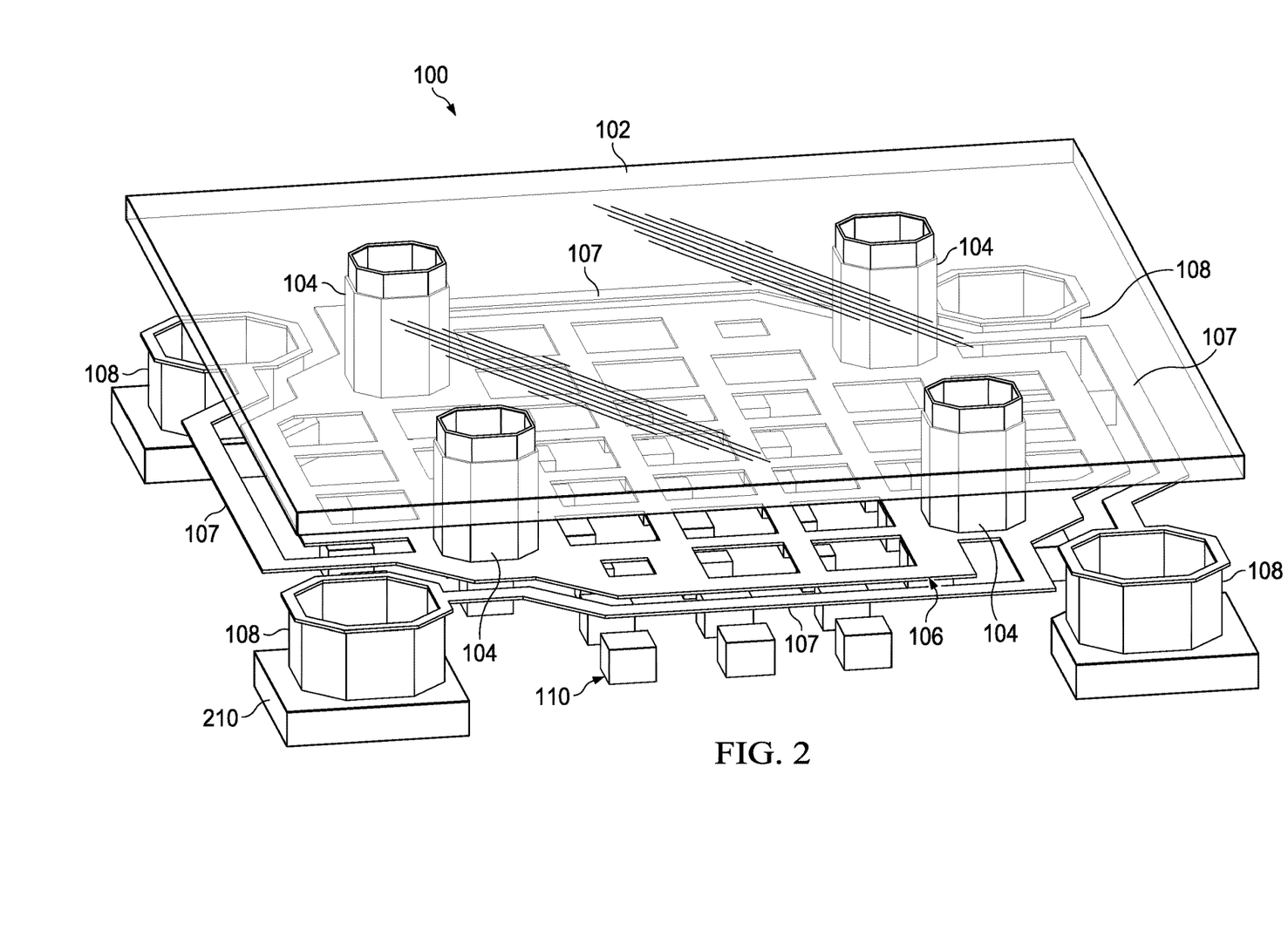
FIG. 2 shows a three-dimensional view of the phase light modulator of FIGS. 1A and 1B in which the hinge plate is perforated in accordance with one configuration.

FIG. 2 shows a three-dimensional view of the structure 100 of FIGS. 1A and 1B. As shown in this example, the hinge plate 106 and base plate 110 are perforated, and the perforations are rectangular (e.g., square). The hinge plate 106 is thus an electrically conductive member having multiple perforations formed therein. Base plate 110 comprises multiple electrodes that generally correspond to the perforations of the hinge plate 106.

Figure 3:
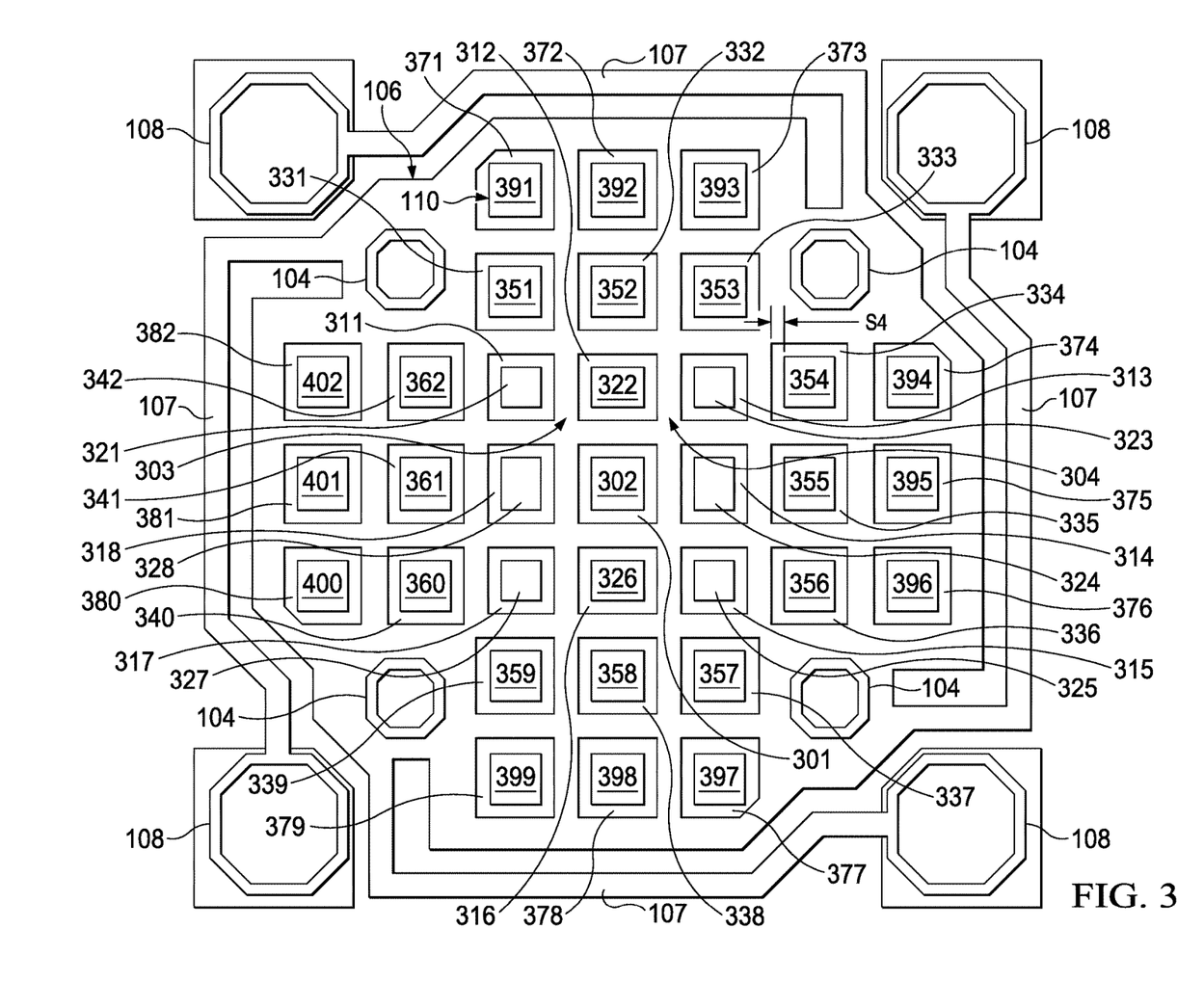
FIG. 3 shows a top-down view of the hinge plate of FIG. 2.

FIG. 3 shows a top-down view of the configuration of the perforated hinge plate 106 and the base plate 110 of FIG. 2. The base plate 110 includes an array of electrodes, and the perforated hinge plate 106 includes an array of corresponding perforations. As shown in FIG. 3, the hinge plate includes a center perforation 301. A set of eight perforations 311-318 surround the center perforation 301. A set of 12 perforations 331-342 surround the eight perforations 311-318. A set of 12 perforations 371-382 surround the 12 perforations 371-382. The base plate 110 has electrodes corresponding to the perforations of the hinge plate 106. Electrode 302 of base plate 110 corresponds to center perforation 301 of hinge plate 106. Electrodes 321-328 correspond to perforations 311-318. Electrodes 351-362 correspond to perforations 331-342. Electrodes 391-402 correspond to perforations 371-382. The shape of each electrode of the base plate 110 generally matches that of the corresponding perforations of the hinge plate 106. In one example, the shape of the perforations and the electrodes is rectangular.

The configuration of the perforated hinge plate 106 shown in FIG. 3 represents a four-bit, digital electrode configuration. Bit 0 corresponds to center electrode 302. Bit 1 corresponds to the ring of electrodes 321-328. Bit 2 corresponds to the ring of electrodes 351-362. Bit 3 corresponds to the ring of electrodes 391-402. Conductive traces (not shown) electrically connect the ring of electrodes 321-328, such that electrodes 321-328 function as a single electrode. Conductive traces electrically connect the ring of electrodes 351-362 such that electrodes 351-362 function as a single electrode. Conductive traces also electrically connect the ring of electrodes 391-402, thereby causing electrodes 391-402 to function as a single electrode. Accordingly, when bit 0 of a four-bit value is asserted (e.g., a "1"), a bias voltage is applied to the center electrode 302. Similarly, when bit 1 is asserted, a bias voltage is applied to the electrode formed by the ring of electrodes 321-328. When bit 2 is asserted, a bias voltage is applied to the electrode formed by the ring of electrodes 351-362. When bit 3 is asserted, a bias voltage is applied to the electrode formed by the ring of electrodes 391-402. The bias voltage applied to each grouping of electrodes may be the same. For example, if bits 0 and 1 are asserted, the same voltage is applied to electrodes 302 and 321-328. If all four bits are asserted, all of electrodes 302, 321-328, 351-362, and 391-402 receive the same voltage.

When viewed from above as in FIG. 3, a gap having a length of S4 separates the conductive portion 354 from the facing wall defined by the corresponding perforation 334. The same length S4 may apply around all four sides of the conductive portion 354, as well as to all of the other conductive portions 302, 321-328, 351-362, and 391-402. S4 should not be arbitrarily small as in such cases, the fringing field effect will be diminished and the device will behave more like a simple perforated hinge with parallel plate electrostatics.

In one example implementation (not shown in FIG. 3), the area of the groupings of electrodes of the base plate 110 is binary-weighted meaning that, if the area of electrode 302 is "X," the total area of the bit 1 ring of electrodes 321-328 is 2X, the total area of the bit 2 ring of electrodes 351-362 is 4X, and the total area of the bit 3 ring of electrodes 391-402 is 8X. When the fringing field actuator is operated in the linear displacement region shown in FIG. 7 (discussed below), the device is capable of relatively large displacement that is not readily achieved with a traditional parallel plate actuator.

Figure 4:
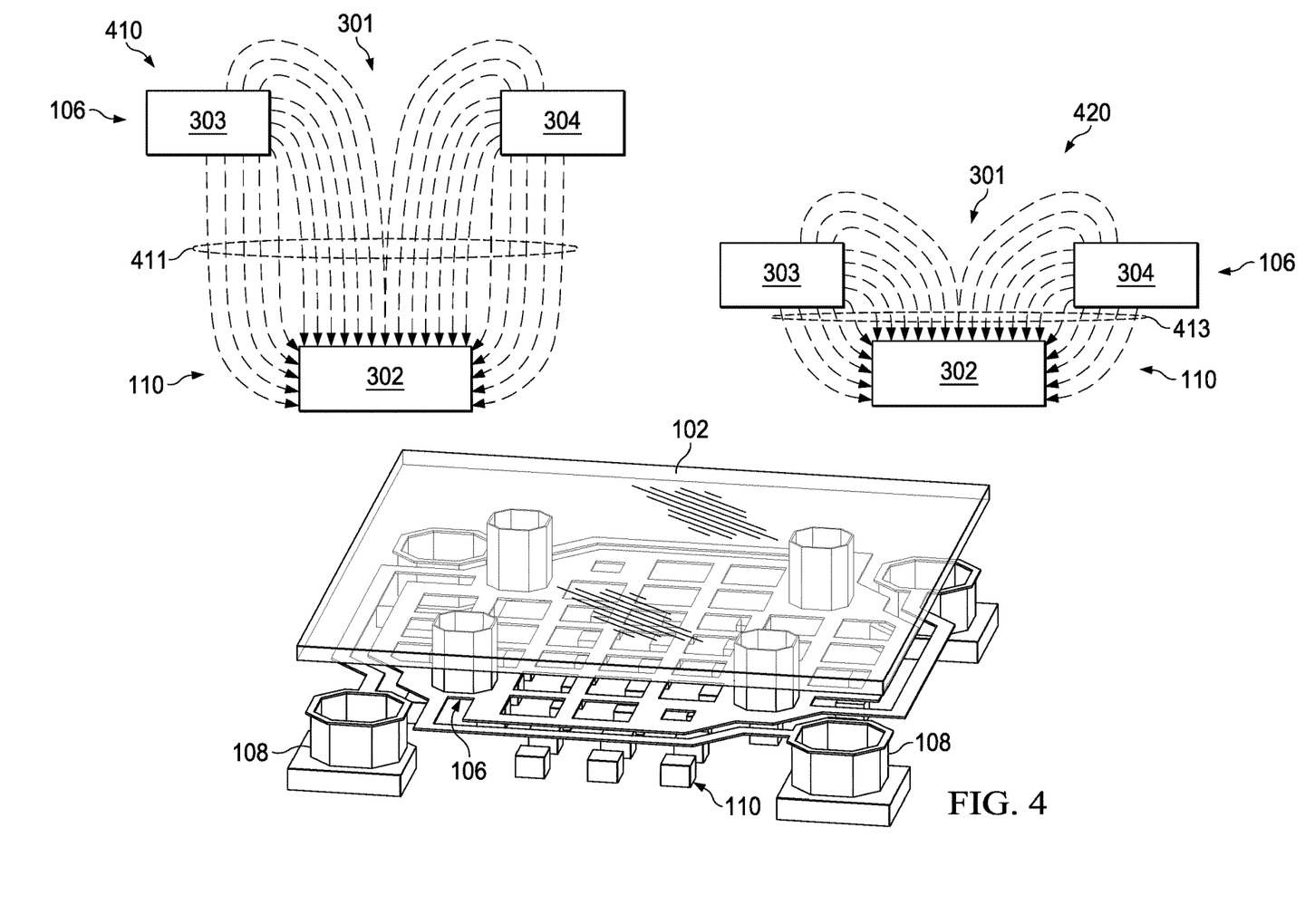
FIG. 4 illustrates fringing fields that are created with a perforated hinge plate.

FIG. 4 illustrates that, by perforating the hinge plate 106 (with corresponding electrodes of the base plate 100), electric fringing fields are created across the electrode area, with the strongest fields at the edges/corners of the perforated hinge plate 106. At 410 in FIG. 4, the center electrode 302 is shown within perforation 301. Perforation 301 is defined, in part, by conductive portions 303 and 304 (also shown in FIG. 3) of the hinge plate 106. Electric field lines 411 are shown between conductive portions 303/304 and electrode 302. At 420, the hinge plate 106 (with its conductive portions 303/304) is shown closer to base plate 110 (with its electrode 302). As the hinge plate 106 is drawn closer to the base plate 110 due to the bias voltage, the electric field created between conductive portions 303/304 and the electrostatic attraction between electrode 302 and 303/304 are dominated by the fringing fields as shown by the electric field lines 413 of 430 versus the electric field lines 411 of 410. As a result, the hinge plate 106 can be brought to the same plane as the base plate 110 without pull-in occurring. All else being equal between an actuator having parallel plates that are not perforated and the perforated hinge plate configuration described with regard to FIGS. 3 and 4, the perforated hinge plate can achieve a greater vertical displacement and thus a greater optical bandwidth of the PLM using such a structure.

The electrostatic force ($F_{EL}$) between the hinge plate 106 and base plate 110 is given by:

$$F_{EL} = \frac{1}{2} \frac{\epsilon A_{EL}}{(g-x)^2} V^2 \qquad (2)$$

Where $A_{EL}$ is the effective area of the hinge plate 106, x is the controllable distance between the hinge plate 106 and base plate 110, and V is the bias voltage. The area ($A_{EL}$) is referred to as the "effective" area. Considering a parallel plate capacitor, $A_0$ would represent the area of the capacitor if one calculated only its surface area facing the other plate. However, for a finite area capacitor, there will exist fringing fields all around the sides. Therefore, the capacitor will have a larger area (the "effective area") than just the two directly opposing faces that are experiencing electric fields. As x increases (meaning the hinge plate 106 becomes closer to the base plate 110 due to the bias voltage being applied to more bit rings of electrodes of the base plate), the effective area $A_{EL}$ decreases. Thus, $A_{EL}$ is modulated as a function of distance between the hinge plate 106 and the base plate 110. A decreasing $A_{EL}$ as the plates draw nearer to each other counteracts, to at least some degree, an increase in x thereby reducing the electrostatic force $F_{EL}$ compared to what $F_{EL}$ would have been with unperforated, parallel plates.

Figure 5A:
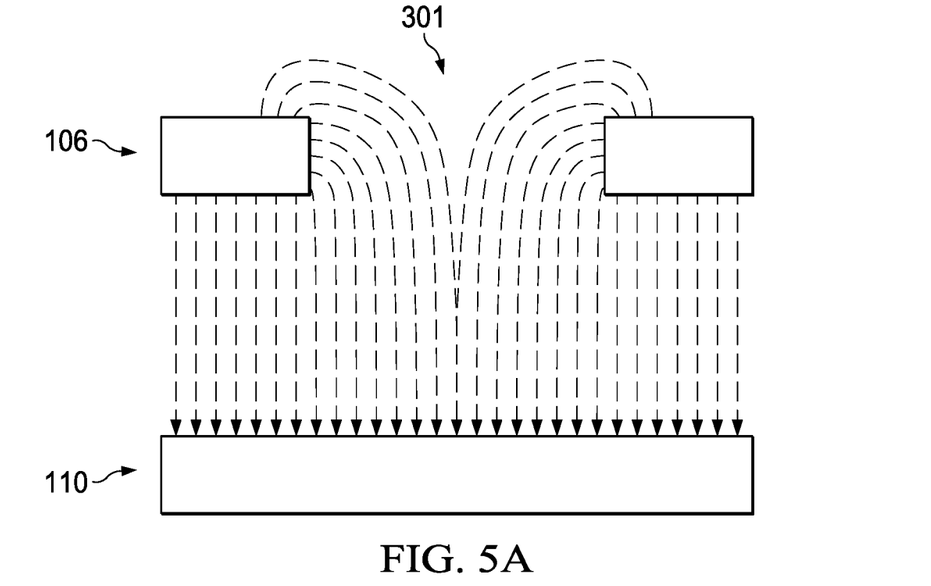
FIGS. 5A and 5B illustrate how a perforated hinge plate but solid base plate result in partial fringing fields.
Figure 5B:
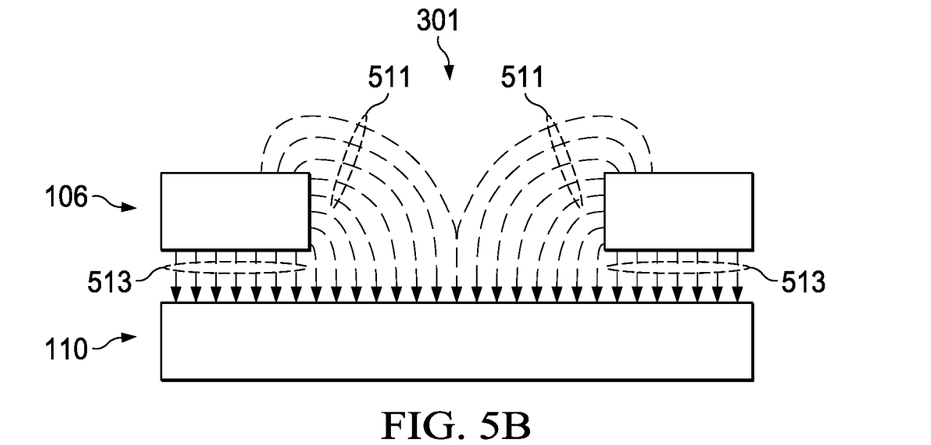

The example of FIGS. 3 and 4 illustrates that the hinge plate 106 is perforated and that the base plate 110 is formed as a series of discrete electrodes. FIGS. 5A and 5B show another example in which the hinge plate 106 is perforated as in FIG. 4, but the base plate 110 is solid (i.e., not discrete electrodes). The electric field lines 511 illustrate that some of the electric field is a fringing field while the electric field 513 illustrates the electric field due to parallel plates. As a result of partial fringing field due to just the hinge plate 106 being perforated, the hinge plate 106 can be brought closer to the base plate 110 before pull-in occurs as compared to a PLM with unperforated, parallel plates.

Figure 6:
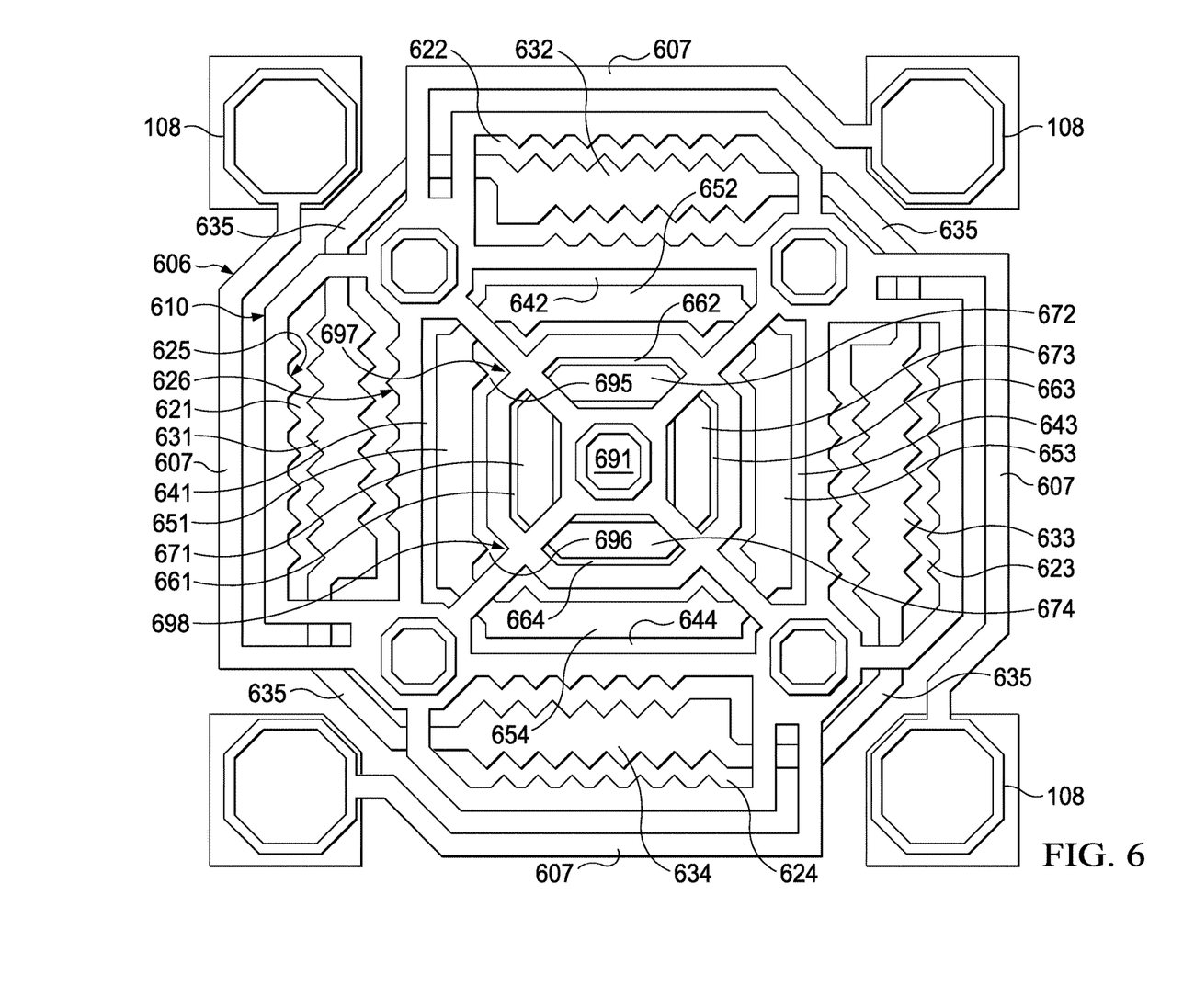
FIG. 6 illustrates another configuration for a perforated hinge plate.

FIG. 6 shows an example of a hinge plate 606 and base plate 610. Flexural arms 607 extend from the support posts 108 into the hinge plate 606 as shown. The hinge plate 606 has a configuration that includes four outer jagged perforations 621-624. Each outer jagged perforation 621-624 has opposing surfaces that have zig-zag shapes. For example, perforation 621 has a pair of opposing surfaces 625 and 626 and each surface has a zig-shape as shown. The same is true of perforations 622-624. The base plate has a configuration with four corresponding jagged electrodes 631-634 that reside within perforations 621-624 when viewed from above as in FIG. 6. Accordingly, each jagged electrode is within a footprint of the corresponding jagged perforation (the footprint of each perforation is larger than the footprint of each corresponding electrode). The area of each electrode 631-634 is smaller than the area of each corresponding perforation 621-624. The electrodes 631-634 are electrically connected by conductive elements 635. In one embodiment, electrodes 631-634 and conductive elements 635 are formed as a unitary conductive structure. The electrode 631-634 represent bit 3 of a four-bit electrode structure. This shape serves multiple purposes. First, by introducing zig-zags, the linear distance that can be contained in a given area is increased. Second, the introduction of sharp points serves to further concentrate the charge at the edges of the conductor and enhance the fringing field effect.

The hinge plate 606 also has an inner set of perforations 641-644, and the base plate has electrodes 651-654 that correspond to perforations 641-644. The area of each electrode 651-654 is smaller than the area of each corresponding perforation 641-644. Each jagged electrode 651-654 is within a footprint of the corresponding jagged perforation 641-644. Electrodes 651-654 are interconnected and correspond to bit 2. The hinge plate 606 further includes perforations 661-664, and the base plate has electrodes 671-674 that correspond to perforations 661-664, and that have areas smaller than the areas of the corresponding perforations. Electrodes 671-674 are interconnected and represent bit 1. Each electrode 671-674 is within a footprint of the corresponding perforation 661-664. The base plate includes a central electrode at 691 (but hidden in the view of FIG. 6). Bit 0 is a parallel plate actuator in this case.

Each of the electrodes 651-654 include a respective pair of triangular protrusions. Electrode 651, for example, illustrates triangular protrusions 695 and 696. The contour of the inner surface of perforation 641 includes a matching triangular recess 697, 698 for each of the triangular protrusions 695, 696. The triangular protrusions facilitate additional fringing fields.

The configuration of FIG. 6 thus includes an output ring of perforations 621-624 that encircles an inner ring of perforations 641-644. Further, the ring of perforations 641-644 encircles the ring of perforations 661-664. The base plate 610 is similarly configured with multiple rings of electrodes-one ring encircling an interior ring, and so on.

The area of the fringing fields may be limited by underlying metal routing. In this case, all metal routing is at the surface, therefore some parallel plate behavior may be unavoidable. Additionally, the perforations should be balanced based on the mechanical stiffness of the hinge. In the case of the PLM, the mirror and mirror vias may increase the rigidity of the hinge at the cost of requiring solid hinge metal below the mirror vias and some surrounding area to account for misalignment. The design of the fringing field electrode should consider fabrication misalignment tolerances as well.

Figure 7:
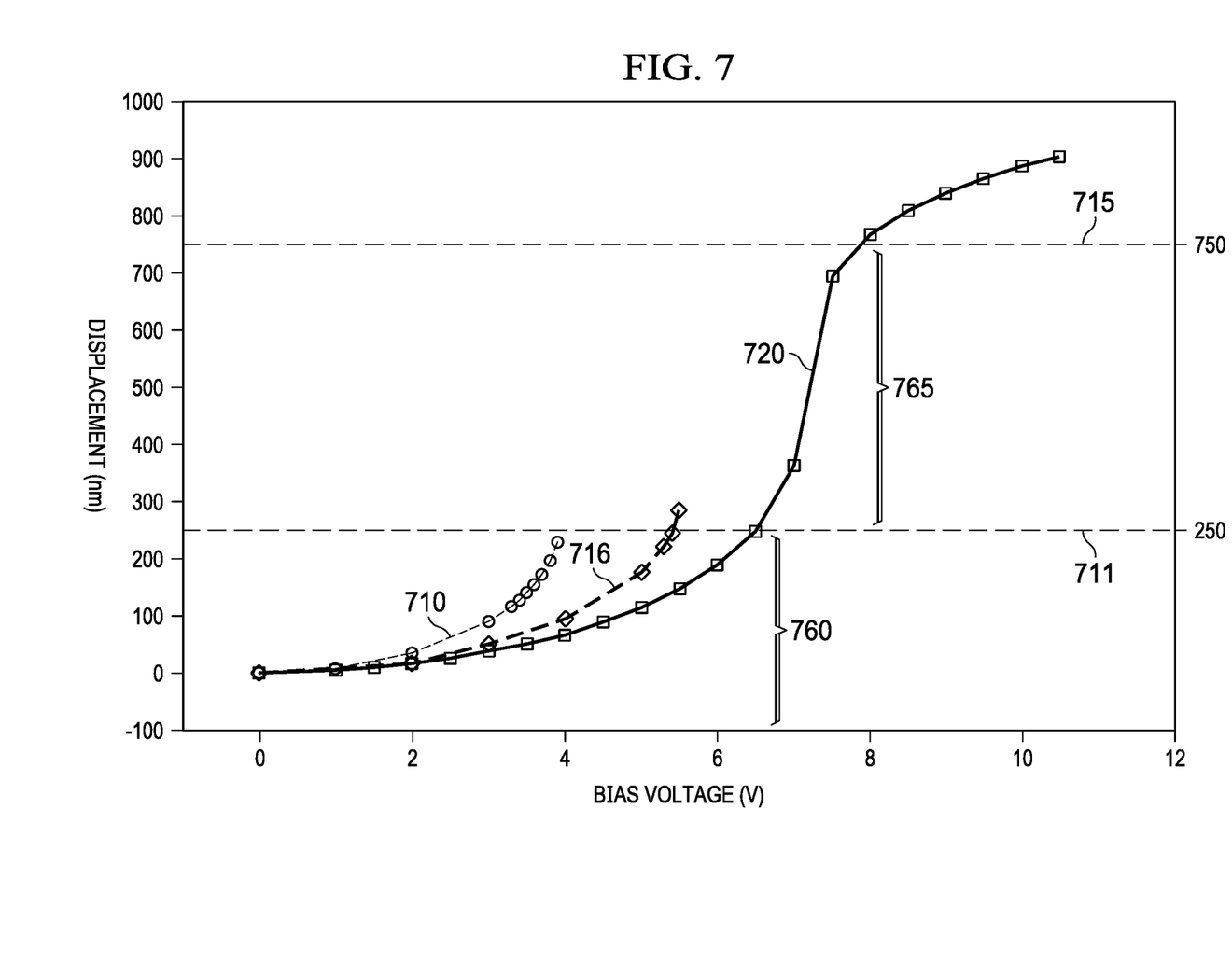
FIG. 7 illustrates a comparison of the relationship between displacement and bias voltage for an unperforated hinge plate-based parallel plate actuator and a perforated hinge plate-based parallel plate actuator.

FIG. 7 shows a plot of displacement versus bias voltage. The displacement values refer to the distance, x, of the hinge plate from its initial state, g. Three curves 710, 716, 720 are shown in FIG. 7. The curves pertain to a parallel plate, PLM. Curve 710 represents the displacement of an unperforated, hinge plate while curve 720 represents the displacement of a perforated hinge plate (e.g., hinge plate 106 of FIG. 3 or 4 or hinge plate 606 of FIG. 6 and a perforated base plate 110). As the bias voltage is increased, curve 710 illustrates that displacement increases as well. Curve 710 terminates at line 711 which represents a displacement of 250 nm. Line 711 is the pull-in point at which two parallel plates (unperforated) undesirably collapse towards each other. Accordingly, the PLM's actuator is incapable of displacements beyond line 711 for unperforated, parallel plates. The example of FIG. 7 is for a g of 750 nm and thus line 711 is a displacement of 250 nm (⅓×750 nm). Curve 716 is for a PLM in which the hinge plate is perforated but not the base plate 110. Some overtravel is implemented in this configuration-more than the unperforated structure characterized by curve 710 but less than the perforated hinge and base plate structure of curve 720.

Curve 720 represents the behavior of a PLM in which the hinge plate is perforated. In this case, the base plate also is constructed as discrete electrodes such as that shown in FIGS. 3 and 6. Due to the fringing fields implemented by those electrode configurations, the actuator is capable of substantially larger displacements. As shown in the example of FIG. 7, the hinge plate is even capable of extending beyond the plane of the base plate 110 and thus is capable of a displacement even greater than the g of 750 nm.

Region 760 is for displacements less than ⅓×g (less than 250 nm in this example). Region 765 is for displacements between one-third and 100 percent of g. The shape of curve 720 within region 760 is different than the shape of the curve 720 within region 765. Within region 760, the perforated hinge plate and the base plate function mostly as parallel plates. Within region 765, however, due to the fringing field effect, the actuator exhibits a more linear relationship between displacement and bias voltage than for region 760. For the disclosed example, despite the desire for linear bit-weighted actuation for a PLM application, with an appropriate feedback and control loop linked to the bias, the full range is usable travel distance that was not possible for prior PLMs.

Modifications are possible in the described embodiments, and other embodiments are possible, within the scope of the claims.

What is claimed is:

1. A phase light modulator, comprising:
   a base layer comprising a base plate;
   a first support post on the base layer;
   a second support post on the base layer;
   a perforated hinge plate over the base plate, the perforated hinge plate having a first flexural arm and a second flexural arm, the first flexural arm coupled to the first support post and the second flexural arm coupled to the second support post;
   a first mirror attachment via on the perforated hinge plate;
   a second mirror attachment via on the perforated hinge plate; and
   a mirror on the first mirror attachment via and the second mirror attachment via, the mirror over the perforated hinge plate, and the mirror over the base plate.

2. The phase light modulator of claim 1, wherein the perforated hinge plate includes:
   a first perforation having a jagged shape, the first perforation having an area; and
   a second perforation having a jagged shape, the second perforation having an area.

3. The phase light modulator of claim 2, wherein the base plate includes:
   a first electrode having a jagged shape, the first electrode having an area that is smaller than the area of the first perforation; and
   a second electrode having a jagged shape, the second electrode having an area that is smaller than the area of the second perforation.

4. The phase light modulator of claim 1, wherein:
   the perforated hinge plate includes a first ring of jagged perforations and a second ring of jagged perforations within the first ring of jagged perforations; and
   the base plate includes a first ring of jagged electrodes, each electrode of the first ring of jagged electrodes being within a footprint of a corresponding jagged perforation of the first ring of jagged perforations, and the base plate includes a second ring of jagged electrodes, each electrode of the second ring of jagged electrodes being within a footprint of a corresponding jagged perforation of the second ring of jagged perforations.

5. The phase light modulator of claim 4, wherein the perforated hinge plate includes a first perforation having first and second opposing surfaces, the first opposing surface has a zig-zag shape, and the second opposing surface also has a zig-zag shape.

6. The phase light modulator of claim 1, wherein the base plate includes first, second, third, and fourth electrodes and the perforated hinge plate includes perforations that correspond to the first, second, third, and fourth electrodes.

7. The phase light modulator of claim 1, wherein the perforated hinge plate includes:
   a first perforation;
   a first ring of perforations encircling the first perforation; and
   a second ring of perforations encircling the first ring of perforations.

8. The phase light modulator of claim 7, wherein the base plate includes:
   a first electrode;
   a first ring of electrodes encircling the first electrode; and
   a second ring of electrodes encircling the first ring of electrodes.

9. The phase light modulator of claim 1, wherein the base plate is configured to receive an electrode voltage and the perforated hinge plate is configured to move toward or away from the base plate based on a potential difference between the base plate and the perforated hinge plate.

10. The phase light modulator of claim 1, wherein the base plate comprises a first electrode and a second electrode, the perforated hinge plate has a first perforation and a second perforation, the first electrode is aligned with the first perforation and the second electrode is aligned with the second perforation.

11. The phase light modulator of claim 10, wherein the first electrode has a first electrode footprint, the second electrode has a second electrode footprint, the first perforation has a first perforation footprint that is larger than the first electrode footprint, and the second perforation has a second perforation footprint that is larger than the second electrode footprint.

12. The phase light modulator of claim 10, wherein the first and second electrodes are rectangular, and the first and second perforations are rectangular.

13. The phase light modulator of claim 1, wherein:
   the base plate comprises an array of electrodes; and
   the perforated hinge plate comprises an array of perforations.

14. The phase light modulator of claim 1, wherein the base plate is configured to receive an electrode voltage to produce a potential difference between the perforated hinge plate and the base plate, a fringing electric field is created between the perforated hinge plate and the base plate at perforations of the perforated hinge plate.

15. The phase light modulator of claim 1, wherein the base plate comprises a first set of electrodes, a second set of electrodes, a third set of electrodes, and a fourth set of electrodes, the phase light modulator further comprising an electrode voltage controller coupled to the first through fourth sets of electrodes and configured to selectively apply a voltage to any of the first through fourth sets of electrodes.

16. The phase light modulator of claim 1, wherein the base layer comprises at least one bias electrode, the first support post and the second support post on the at least one bias electrode.

17. The phase light modulator of claim 1, wherein the first support post extends in a first direction from the perforated hinge plate, the first mirror attachment via extends in a second direction from the perforated hinge plate, and the second direction is opposite the first direction.

* * * * *